US006747669B1

(12) United States Patent
Yamaguchi et al.

(10) Patent No.: US 6,747,669 B1
(45) Date of Patent: Jun. 8, 2004

(54) METHOD FOR VARYING INITIAL VALUE IN GRAY SCALE MODIFICATION

(75) Inventors: Machihiko Yamaguchi, Tokyo (JP); Koichi Koga, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 491 days.

(21) Appl. No.: 09/665,264

(22) Filed: Sep. 19, 2000

(30) Foreign Application Priority Data

Sep. 22, 1999 (JP) .......................................... 11-269095

(51) Int. Cl.[7] ............................................... G06T 11/00
(52) U.S. Cl. ........................ 345/690; 345/605; 345/691
(58) Field of Search ................................ 345/605, 690, 345/691

(56) References Cited

U.S. PATENT DOCUMENTS 5,621,825 A * 4/1997 Masaki et al. .............. 382/274
5,844,533 A * 12/1998 Usui et al. .................... 345/89

FOREIGN PATENT DOCUMENTS

JP 63-155954 6/1988
JP 7-140927 6/1995
JP 8-307678 11/1996
JP 9-90902 4/1997

* cited by examiner

*Primary Examiner*—Michael Razavi
*Assistant Examiner*—Motilewa Good-Johnson
(74) *Attorney, Agent, or Firm*—Choate, Hall & Stewart

(57) ABSTRACT

An error diffusing circuit modifies input video data signals representative of the gray levels of 8-bit gradation to output video data signals representative of the gray levels of 6-bit gradation, and an initial value generator produces an initial value for each of the first video data signals on each line of a frame, wherein the initial value generator varies the initial value depending upon the combination of a frame number, a line number and the color so that any pattern is not unintentionally produced on the display panel.

10 Claims, 14 Drawing Sheets

| FRAME | LINE | RA | GA | BA | RB | GB | BB |
|---|---|---|---|---|---|---|---|
| 1 | 1 | 0 | 2 | 1 | 3 | 0 | 2 |
| | 2 | 1 | 3 | 2 | 0 | 1 | 3 |
| | 3 | 2 | 0 | 3 | 1 | 2 | 0 |
| | 4 | 3 | 1 | 0 | 2 | 3 | 1 |
| 2 | 1 | 2 | 0 | 3 | 1 | 2 | 0 |
| | 2 | 3 | 1 | 0 | 2 | 3 | 1 |
| | 3 | 0 | 2 | 1 | 3 | 0 | 2 |
| | 4 | 1 | 3 | 2 | 0 | 1 | 3 |
| 3 | 1 | 1 | 3 | 2 | 0 | 1 | 3 |
| | 2 | 2 | 0 | 3 | 1 | 2 | 0 |
| | 3 | 3 | 1 | 0 | 2 | 3 | 1 |
| | 4 | 0 | 2 | 1 | 3 | 0 | 2 |
| 4 | 1 | 3 | 1 | 0 | 2 | 3 | 1 |
| | 2 | 0 | 2 | 1 | 3 | 0 | 2 |
| | 3 | 1 | 3 | 2 | 0 | 1 | 3 |
| | 4 | 2 | 0 | 3 | 1 | 2 | 0 |
| 5 | 1 | 2 | 0 | 3 | 1 | 2 | 0 |
| | 2 | 3 | 1 | 0 | 2 | 3 | 1 |
| | 3 | 0 | 2 | 1 | 3 | 0 | 2 |
| | 4 | 1 | 3 | 2 | 0 | 1 | 3 |
| 6 | 1 | 0 | 2 | 1 | 3 | 0 | 2 |
| | 2 | 1 | 3 | 2 | 0 | 1 | 3 |
| | 3 | 2 | 0 | 3 | 1 | 2 | 0 |
| | 4 | 3 | 1 | 0 | 2 | 3 | 1 |
| 7 | 1 | 3 | 1 | 0 | 2 | 3 | 1 |
| | 2 | 0 | 2 | 1 | 3 | 0 | 2 |
| | 3 | 1 | 3 | 2 | 0 | 1 | 3 |
| | 4 | 2 | 0 | 3 | 1 | 2 | 0 |
| 8 | 1 | 1 | 3 | 2 | 0 | 1 | 3 |
| | 2 | 2 | 0 | 3 | 1 | 2 | 0 |
| | 3 | 3 | 1 | 0 | 2 | 3 | 1 |
| | 4 | 0 | 2 | 1 | 3 | 0 | 2 |

| LINE | INITIAL VALUE IN ODD FRAMES | INITIAL VALUE IN EVEN FRAMES |
|---|---|---|
| 1 | 7 | 3 |
| 2 | 1 | 5 |
| 3 | 2 | 6 |
| 4 | 4 | 0 |
| 5 | 3 | 7 |
| 6 | 5 | 1 |
| 7 | 6 | 2 |
| 8 | 0 | 4 |

Fig. 2
PRIOR ART

| FRAME | LINE | RA | GA | BA | RB | GB | BB |
|---|---|---|---|---|---|---|---|
| 1 | 1 | 0 | 2 | 1 | 3 | 0 | 2 |
| | 2 | 1 | 3 | 2 | 0 | 1 | 3 |
| | 3 | 2 | 0 | 3 | 1 | 2 | 0 |
| | 4 | 3 | 1 | 0 | 2 | 3 | 1 |
| 2 | 1 | 2 | 0 | 3 | 1 | 2 | 0 |
| | 2 | 3 | 1 | 0 | 2 | 3 | 1 |
| | 3 | 0 | 2 | 1 | 3 | 0 | 2 |
| | 4 | 1 | 3 | 2 | 0 | 1 | 3 |
| 3 | 1 | 1 | 3 | 2 | 0 | 1 | 3 |
| | 2 | 2 | 0 | 3 | 1 | 2 | 0 |
| | 3 | 3 | 1 | 0 | 2 | 3 | 1 |
| | 4 | 0 | 2 | 1 | 3 | 0 | 2 |
| 4 | 1 | 3 | 1 | 0 | 2 | 3 | 1 |
| | 2 | 0 | 2 | 1 | 3 | 0 | 2 |
| | 3 | 1 | 3 | 2 | 0 | 1 | 3 |
| | 4 | 2 | 0 | 3 | 1 | 2 | 0 |
| 5 | 1 | 2 | 0 | 3 | 1 | 2 | 0 |
| | 2 | 3 | 1 | 0 | 2 | 3 | 1 |
| | 3 | 0 | 2 | 1 | 3 | 0 | 2 |
| | 4 | 1 | 3 | 2 | 0 | 1 | 3 |
| 6 | 1 | 0 | 2 | 1 | 3 | 0 | 2 |
| | 2 | 1 | 3 | 2 | 0 | 1 | 3 |
| | 3 | 2 | 0 | 3 | 1 | 2 | 0 |
| | 4 | 3 | 1 | 0 | 2 | 3 | 1 |
| 7 | 1 | 3 | 1 | 0 | 2 | 3 | 1 |
| | 2 | 0 | 2 | 1 | 3 | 0 | 2 |
| | 3 | 1 | 3 | 2 | 0 | 1 | 3 |
| | 4 | 2 | 0 | 3 | 1 | 2 | 0 |
| 8 | 1 | 1 | 3 | 2 | 0 | 1 | 3 |
| | 2 | 2 | 0 | 3 | 1 | 2 | 0 |
| | 3 | 3 | 1 | 0 | 2 | 3 | 1 |
| | 4 | 0 | 2 | 1 | 3 | 0 | 2 |

+1
+1
+1
+2
+3
+2
+3
+2
+3
+2
+3

Fig. 5

| LINE NUMBER | PATTERN | | | | | |
|---|---|---|---|---|---|---|
| | 1 | 2 | 3 | 4 | 5 | 6 |
| 1 | | | | | | |
| | + 1 | + 1 | + 2 | + 2 | + 3 | + 3 |
| 2 | | | | | | |
| | + 1 | + 2 | + 1 | + 3 | + 2 | + 3 |
| **3** | | | | | | |
| | + 1 | + 3 | + 2 | + 2 | + 1 | + 3 |
| 4 | | | | | | |

Fig. 7

| | | FIRST VIDEO DATA SIGNAL | | | | | | SECOND VIDEO DATA SIGNAL | | | | | | THIRD VIDEO DATA SIGNAL | | | | | | FOURTH VIDEO DATA SIGNAL | | | | | |
|---|---|---|---|---|---|---|---|---|---|---|---|---|---|---|---|---|---|---|---|---|---|---|---|---|---|
| | | RA | GA | BA | RB | GB | BB | RA | GA | BA | RB | GB | BB | RA | GA | BA | RB | GB | BB | RA | GA | BA | RB | GB | BB |
| LINE | 1 | 1 | 3 | 2 | 0 | 1 | 3 | 2 | 0 | 3 | 1 | 2 | 0 | 3 | 1 | 0 | 2 | 3 | 1 | 0 | 2 | 1 | 3 | 0 | 2 |
| | 2 | 2 | 0 | 3 | 1 | 2 | 0 | 3 | 1 | 0 | 2 | 3 | 1 | 0 | 2 | 1 | 3 | 0 | 2 | 1 | 3 | 2 | 0 | 1 | 3 |
| | 3 | 3 | 1 | 0 | 2 | 3 | 1 | 0 | 2 | 1 | 3 | 0 | 2 | 1 | 3 | 2 | 0 | 1 | 3 | 2 | 0 | 3 | 1 | 2 | 0 |
| | 4 | 0 | 2 | 1 | 3 | 0 | 2 | 1 | 3 | 2 | 0 | 1 | 3 | 2 | 0 | 3 | 1 | 2 | 0 | 3 | 1 | 0 | 2 | 3 | 1 |
| | 5 | 1 | 3 | 2 | 0 | 1 | 3 | 2 | 0 | 3 | 1 | 2 | 0 | 3 | 1 | 0 | 2 | 3 | 1 | 0 | 2 | 1 | 3 | 0 | 2 |
| | 6 | 2 | 0 | 3 | 1 | 2 | 0 | 3 | 1 | 0 | 2 | 3 | 1 | 0 | 2 | 1 | 3 | 0 | 2 | 1 | 3 | 2 | 0 | 1 | 3 |
| | 7 | 3 | 1 | 0 | 2 | 3 | 1 | 0 | 2 | 1 | 3 | 0 | 2 | 1 | 3 | 2 | 0 | 1 | 3 | 2 | 0 | 3 | 1 | 2 | 0 |
| | 8 | 0 | 2 | 1 | 3 | 0 | 2 | 1 | 3 | 2 | 0 | 1 | 3 | 2 | 0 | 3 | 1 | 2 | 0 | 3 | 1 | 0 | 2 | 3 | 1 |

Fig. 9

| FRAME | LINE | RA | GA | BA | RB | GB | BB |
|---|---|---|---|---|---|---|---|
| 1 | 1 | 0 | 1 | 3 | 2 | 0 | 1 |
| | 2 | 1 | 2 | 0 | 3 | 1 | 2 |
| | 3 | 3 | 0 | 2 | 1 | 3 | 0 |
| | 4 | 2 | 3 | 1 | 0 | 2 | 3 |
| 2 | 1 | 3 | 0 | 2 | 1 | 3 | 0 |
| | 2 | 0 | 1 | 3 | 2 | 0 | 1 |
| | 3 | 2 | 3 | 1 | 0 | 2 | 3 |
| | 4 | 1 | 2 | 0 | 3 | 1 | 2 |
| 3 | 1 | 2 | 3 | 1 | 0 | 2 | 3 |
| | 2 | 3 | 0 | 2 | 1 | 3 | 0 |
| | 3 | 1 | 2 | 0 | 3 | 1 | 2 |
| | 4 | 0 | 1 | 3 | 2 | 0 | 1 |
| 4 | 1 | 1 | 2 | 0 | 3 | 1 | 2 |
| | 2 | 2 | 3 | 1 | 0 | 2 | 3 |
| | 3 | 0 | 1 | 3 | 2 | 0 | 1 |
| | 4 | 3 | 0 | 2 | 1 | 3 | 0 |
| 5 | 1 | 3 | 0 | 2 | 1 | 3 | 0 |
| | 2 | 0 | 1 | 3 | 2 | 0 | 1 |
| | 3 | 2 | 3 | 1 | 0 | 2 | 3 |
| | 4 | 1 | 2 | 0 | 3 | 1 | 2 |
| 6 | 1 | 0 | 1 | 3 | 2 | 0 | 1 |
| | 2 | 1 | 2 | 0 | 3 | 1 | 2 |
| | 3 | 3 | 0 | 2 | 1 | 3 | 0 |
| | 4 | 2 | 3 | 1 | 0 | 2 | 3 |
| 7 | 1 | 1 | 2 | 0 | 3 | 1 | 2 |
| | 2 | 2 | 3 | 1 | 0 | 2 | 3 |
| | 3 | 0 | 1 | 3 | 2 | 0 | 1 |
| | 4 | 3 | 0 | 2 | 1 | 3 | 0 |
| 8 | 1 | 2 | 3 | 1 | 0 | 2 | 3 |
| | 2 | 3 | 0 | 2 | 1 | 3 | 0 |
| | 3 | 1 | 2 | 0 | 3 | 1 | 2 |
| | 4 | 0 | 1 | 3 | 2 | 0 | 1 |

Fig. 10

| | FIRST VIDEO DATA SIGNAL | | | | | | SECOND VIDEO DATA SIGNAL | | | | | | THIRD VIDEO DATA SIGNAL | | | | | | FOURTH VIDEO DATA SIGNAL | | | | | |
|---|---|---|---|---|---|---|---|---|---|---|---|---|---|---|---|---|---|---|---|---|---|---|---|---|
| LINE | R A | G A | B A | R B | G B | B B | R A | G A | B A | R B | G B | B B | R A | G A | B A | R B | G B | B B | R A | G A | B A | R B | G B | B B |
| 1 | 1 | 2 | 0 | 3 | 1 | 2 | 2 | 3 | 1 | 0 | 2 | 3 | 3 | 0 | 2 | 1 | 3 | 0 | 0 | 1 | 3 | 2 | 0 | 1 |
| 2 | 2 | 3 | 1 | 0 | 2 | 3 | 3 | 0 | 2 | 1 | 3 | 0 | 0 | 1 | 3 | 2 | 0 | 1 | 1 | 2 | 0 | 3 | 1 | 2 |
| 3 | 0 | 1 | 3 | 2 | 0 | 1 | 1 | 2 | 0 | 3 | 1 | 2 | 2 | 3 | 1 | 0 | 2 | 3 | 3 | 0 | 2 | 1 | 3 | 0 |
| 4 | 3 | 0 | 2 | 1 | 3 | 0 | 0 | 1 | 3 | 2 | 0 | 1 | 1 | 2 | 0 | 3 | 1 | 2 | 2 | 3 | 1 | 0 | 2 | 3 |
| 5 | 1 | 2 | 0 | 3 | 1 | 2 | 2 | 3 | 1 | 0 | 2 | 3 | 3 | 0 | 2 | 1 | 3 | 0 | 0 | 1 | 3 | 2 | 0 | 1 |
| 6 | 2 | 3 | 1 | 0 | 2 | 3 | 3 | 0 | 2 | 1 | 3 | 0 | 0 | 1 | 3 | 2 | 0 | 1 | 1 | 2 | 0 | 3 | 1 | 2 |
| 7 | 0 | 1 | 3 | 2 | 0 | 1 | 1 | 2 | 0 | 3 | 1 | 2 | 2 | 3 | 1 | 0 | 2 | 3 | 3 | 0 | 2 | 1 | 3 | 0 |
| 8 | 3 | 0 | 2 | 1 | 3 | 0 | 0 | 1 | 3 | 2 | 0 | 1 | 1 | 2 | 0 | 3 | 1 | 2 | 2 | 3 | 1 | 0 | 2 | 3 |

Fig. 11

| | | FIRST VIDEO DATA SIGNAL | | | | | | SECOND VIDEO DATA SIGNAL | | | | | | THIRD VIDEO DATA SIGNAL | | | | | | FOURTH VIDEO DATA SIGNAL | | | | | |
|---|---|---|---|---|---|---|---|---|---|---|---|---|---|---|---|---|---|---|---|---|---|---|---|---|---|
| | | RA | GA | BA | RB | GB | BB | RA | GA | BA | RB | GB | BB | RA | GA | BA | RB | GB | BB | RA | GA | BA | RB | GB | BB |
| LINE | 1 | 0 | 1 | 3 | 2 | 0 | 1 | 1 | 2 | 0 | 3 | 1 | 2 | 2 | 3 | 1 | 0 | 2 | 3 | 3 | 0 | 2 | 1 | 3 | 0 |
| | 2 | 1 | 2 | 0 | 3 | 1 | 2 | 2 | 3 | 1 | 0 | 2 | 3 | 3 | 0 | 2 | 1 | 3 | 0 | 0 | 1 | 3 | 2 | 0 | 1 |
| | 3 | 3 | 0 | 2 | 1 | 3 | 0 | 0 | 1 | 3 | 2 | 0 | 1 | 1 | 2 | 0 | 3 | 1 | 2 | 2 | 3 | 1 | 0 | 2 | 3 |
| | 4 | 2 | 3 | 1 | 0 | 2 | 3 | 3 | 0 | 2 | 1 | 3 | 0 | 0 | 1 | 3 | 2 | 0 | 1 | 1 | 2 | 0 | 3 | 1 | 2 |
| | 5 | 1 | 2 | 0 | 3 | 1 | 2 | 2 | 3 | 1 | 0 | 2 | 3 | 3 | 0 | 2 | 1 | 3 | 0 | 0 | 1 | 3 | 2 | 0 | 1 |
| | 6 | 0 | 1 | 3 | 2 | 0 | 1 | 1 | 2 | 0 | 3 | 1 | 2 | 2 | 3 | 1 | 0 | 2 | 3 | 3 | 0 | 2 | 1 | 3 | 0 |
| | 7 | 2 | 3 | 1 | 0 | 2 | 3 | 3 | 0 | 2 | 1 | 3 | 0 | 0 | 1 | 3 | 2 | 0 | 1 | 1 | 2 | 0 | 3 | 1 | 2 |
| | 8 | 3 | 0 | 2 | 1 | 3 | 0 | 0 | 1 | 3 | 2 | 0 | 1 | 1 | 2 | 0 | 3 | 1 | 2 | 2 | 3 | 1 | 0 | 2 | 3 |

Fig. 12

| | | FIRST VIDEO DATA SIGNAL | | | | | | SECOND VIDEO DATA SIGNAL | | | | | | THIRD VIDEO DATA SIGNAL | | | | | | FOURTH VIDEO DATA SIGNAL | | | | | |
|---|---|---|---|---|---|---|---|---|---|---|---|---|---|---|---|---|---|---|---|---|---|---|---|---|---|
| | | RA | GA | BA | RB | GB | BB | RA | GA | BA | RB | GB | BB | RA | GA | BA | RB | GB | BB | RA | GA | BA | RB | GB | BB |
| LINE | 1 | 3 | 0 | 2 | 1 | 3 | 0 | 0 | 1 | 3 | 2 | 0 | 1 | 1 | 2 | 0 | 3 | 1 | 2 | 2 | 3 | 1 | 0 | 2 | 3 |
| | 2 | 0 | 1 | 3 | 2 | 0 | 1 | 1 | 2 | 0 | 3 | 1 | 2 | 2 | 3 | 1 | 0 | 2 | 3 | 3 | 0 | 2 | 1 | 3 | 0 |
| | 3 | 2 | 3 | 1 | 0 | 2 | 3 | 3 | 0 | 2 | 1 | 3 | 0 | 0 | 1 | 3 | 2 | 0 | 1 | 1 | 2 | 0 | 3 | 1 | 2 |
| | 4 | 1 | 2 | 0 | 3 | 1 | 2 | 2 | 3 | 1 | 0 | 2 | 3 | 3 | 0 | 2 | 1 | 3 | 0 | 0 | 1 | 3 | 2 | 0 | 1 |
| | 5 | 0 | 1 | 3 | 2 | 0 | 1 | 1 | 2 | 0 | 3 | 1 | 2 | 2 | 3 | 1 | 0 | 2 | 3 | 3 | 0 | 2 | 1 | 3 | 0 |
| | 6 | 3 | 0 | 2 | 1 | 3 | 0 | 0 | 1 | 3 | 2 | 0 | 1 | 1 | 2 | 0 | 3 | 1 | 2 | 2 | 3 | 1 | 0 | 2 | 3 |
| | 7 | 1 | 2 | 0 | 3 | 1 | 2 | 2 | 3 | 1 | 0 | 2 | 3 | 3 | 0 | 2 | 1 | 3 | 0 | 0 | 1 | 3 | 2 | 0 | 1 |
| | 8 | 2 | 3 | 1 | 0 | 2 | 3 | 3 | 0 | 2 | 1 | 3 | 0 | 0 | 1 | 3 | 2 | 0 | 1 | 1 | 2 | 0 | 3 | 1 | 2 |

Fig. 13

| | | FIRST VIDEO DATA SIGNAL | | | | | | SECOND VIDEO DATA SIGANL | | | | | | THIRD VIDEO DATA SIGNAL | | | | | | FOURTH VIDEO DATA SIGNAL | | | | | |
|---|---|---|---|---|---|---|---|---|---|---|---|---|---|---|---|---|---|---|---|---|---|---|---|---|---|
| | | R A | G A | B A | R B | G B | B B | R A | G A | B A | R B | G B | B B | R A | G A | B A | R B | G B | B B | R A | G A | B A | R B | G B | B B |
| LINE | 1 | 2 | 3 | 1 | 0 | 2 | 3 | 3 | 0 | 2 | 1 | 3 | 0 | 0 | 1 | 3 | 2 | 0 | 1 | 1 | 2 | 0 | 3 | 1 | 2 |
| | 2 | 3 | 0 | 2 | 1 | 3 | 0 | 0 | 1 | 3 | 2 | 0 | 1 | 1 | 2 | 0 | 3 | 1 | 2 | 2 | 3 | 1 | 0 | 2 | 3 |
| | 3 | 1 | 2 | 0 | 3 | 1 | 2 | 2 | 3 | 1 | 0 | 2 | 3 | 3 | 0 | 2 | 1 | 3 | 0 | 0 | 1 | 3 | 2 | 0 | 1 |
| | 4 | 0 | 1 | 3 | 2 | 0 | 1 | 1 | 2 | 0 | 3 | 1 | 2 | 2 | 3 | 1 | 0 | 2 | 3 | 3 | 0 | 2 | 1 | 3 | 0 |
| | 5 | 3 | 0 | 2 | 1 | 3 | 0 | 0 | 1 | 3 | 2 | 0 | 1 | 1 | 2 | 0 | 3 | 1 | 2 | 2 | 3 | 1 | 0 | 2 | 3 |
| | 6 | 2 | 3 | 1 | 0 | 2 | 3 | 3 | 0 | 2 | 1 | 3 | 0 | 0 | 1 | 3 | 2 | 0 | 1 | 1 | 2 | 0 | 3 | 1 | 2 |
| | 7 | 0 | 1 | 3 | 2 | 0 | 1 | 1 | 2 | 0 | 3 | 1 | 2 | 2 | 3 | 1 | 0 | 2 | 3 | 3 | 0 | 2 | 1 | 3 | 0 |
| | 8 | 1 | 2 | 0 | 3 | 1 | 2 | 2 | 3 | 1 | 0 | 2 | 3 | 3 | 0 | 2 | 1 | 3 | 0 | 0 | 1 | 3 | 2 | 0 | 1 |

Fig. 14

METHOD FOR VARYING INITIAL VALUE IN GRAY SCALE MODIFICATION

FIELD OF THE INVENTION

This invention relates to an image processing technology and, more particularly, to a method for varying an initial value in a pseudo-gray scale modification.

DESCRIPTION OF THE RELATED ART

A liquid crystal display panel and a plasma display panel are examples of a thin video image producing apparatus. In the following description, term "display panel" is used for the thin video image producing apparatus. Pieces of video data information are usually supplied to the display panel through a digital signal. The gradation of image produced on the display panel is dependent on the bits of the digital video data signal. When a piece of video data information is represented by six bits, the panel display is able to produce 64 gray levels. On the other hand, if the digital video signal contains eight bits representing a piece of video data information, the gradation range is expanded to 256 gray levels. The gradation has been changed from 6-bit gradation to 8-bit gradation.

Digital chrominance signals are assumed to carry a piece of video data information representative of a full color image. The piece of video data information is broken down into three sub-pieces of video data information representative of a sub-image colored in red, a sub-image colored in green and a sub-image colored in green, and the chrominance signals are respectively assigned to the three sub-pieces of video data information. In the following description, "R", "G" and "B" stand for red, green and blue, respectively. When the gradation is changed from 6 bits to 8 bits, each of the chrominance signals requires two additional bits, and an image data processing circuit is enlarged.

A display panel is assumed to have the resolution "SXGA", i.e., 1280 lines ×1024 lines. In order to produce a full color image on the display panel from a piece of data information, the display panel requires two ports {(RA, GA, BA), (RB, GB, BB)}, and the piece of image data information is supplied through the two ports to a controller. The output signals of the controller are reduced in frequency, and arc supplied through four ports to a driver. The controller and the driver are in the form of semiconductor integrated circuit device, and are mounted on a circuit board. Various signal lines are printed on the circuit board, and the output signals are supplied from the controller through the signal lines to the driver. The number of signal lines is calculated as 8 bits ×3 colors ×4 ports, and is 96 lines. If each of the chrominance signals includes 6 bits representative of the sub-piece of video data information, only 72 signal lines propagate the output signals. Thus, the increase of gray levels results in the enlargement of the circuit board. Moreover, the driver circuit copes with the increase of the gray levels, and is also enlarged. This results in increase of the production cost.

As described hereinbefore, the enhancement of gradation results in the enlargement of the video data processing circuit. If the video data processing circuit for the 6-bit gradation is available for the video image represented by the 8-bit video signal, the production cost is restricted. For this reason, a pseudo-gray scale modification technique such as the dither technique or the frame rate controlling technique is employed in the video data processing circuit.

One of the pseudo-gray scale modification techniques is constructed on the basis of the error diffusion, and an example is disclosed in Japanese Patent Publication of Unexamined Application No. 9-90902. The Japanese Patent Publication of Unexamined Application teaches that the error diffusion is carried out in the direction of line and that the initial value is varied at every line and every frame. The prior art pseudo-gray scale modification is hereinbelow described in detail.

FIG. 1 shows a typical example of the error diffusion circuit. The prior art error diffusion circuit has two ports (not shown), and 8-bit video data signals RA, GA, BA and RB, GB, BB are sequentially input to the associated ports. Each of the 8-bit video data signals is separated into six high-order bits and two low-order bits. The six high-order bits are directly supplied to an input port "a" of an adder 107, and the two low-order bits are supplied through an adder 106 to the other input port "b" of the adder 107. The two low-order bits are supplied to an input port "c" of the adder 106, and a carry bit is supplied from a carry port "CRY" of the adder 106 to the input port "b" of the adder 107, and the adder 107 outputs 6-bit video data signals RA/GA/BA and RB/GB/BB.

An initial value generator 101 and a flip-flop circuit 103 are connected in parallel to two input ports "1"/"0" of a selector 102. The initial value generator 101 supplies 2-bit signal representative of an initial value to the input port "1" of the selector 102, and the flip-flop circuit 103 supplies the previous sum "c+d" to the input port "0" of the selector 102. The selector 102 is responsive to a control signal 105 so as to selectively connect the input ports "1" and "0" to the output port "Y". The output port "Y" of the selector 102 is connected to the other input port "d" of the adder 106. The adder 106 adds the value at the input port "d" to the value at the input port "c", and produces the sum "c+d" and the carry. The sum "c+d" is supplied from the output port "c+d" to an input port "D" of the flip-flop circuit 103, and the carry is supplied from the carry port "CRY" to the input port "b" of the adder 107. An internal clock signal 104 is supplied to the clock node "CK" of the flip-flop circuit 103, and the flip-flop circuit 103 latches the sum "c+d" in response to the internal clock signal 104.

When the first video data signal RA1, GA1, BA1, RB1, GB1 or BB1 of each frame is supplied through the port, the control signal 105 instructs the selector 102 to connect the initial value generator 101 to the input port "d" of the adder 106. The initial value is transferred through the selector 102 to the input port "d" of the adder 106. The initial value is added to the value represented by the two low-order bits of the first video data signal RA1/GA1/BA1/RB1/GB1/BB1. Then, the sum "c+d" is produced. The sum "c+d" is representative of an error. If the carry takes place, the carry bit is supplied from the adder 106 to the input port "b" of the adder 107, and is added to the six high-order bits.

The control signal 105 instructs the selector 102 to change the input port from "1" to "0". When the next internal clock signal is changed to the active level, the sum "c+d" is latched by the flip-flop circuit 103. The sum "c+d" is transferred through the selector 102 to the input port "d", and is added to the two low-order bits of the second video data signal of the same frame. The control signal 105 keeps the signal propagation path from the input port "0" to the output port "Y" in the selector 102 until the last video data signal.

When the first video data signal of the next frame is supplied to the port, the control signal 105 instructs the selector 102 to connect the input port "1" to the output port "Y". The initial value generator 101 supplies an initial value through the selector 102 to the input port "d" of the adder 106. However, the initial value is not fixed. When the line or the frame is changed, the initial value generator 101 changes the initial value.

In the prior art error diffusion circuit disclosed in Japanese Patent Publication of Unexamined Application No. 9-90902, three low-order bits are added to the previous sum, i.e., the error, and the error is circulated. The initial value generator changes the initial value as shown in FIG. 2. Eight lines form a line group, and the initial value is changed in every line group of each odd frame as “7”, “1”, “2”, “4”, “3”, “5”, “6” and “0”. On the other hand, the initial value generator changes the initial value in every line group of each even frame as “3”, “5”, “6”, “0”, “7”, “1”, “2” and “4”. Thus, the initial value is changed between the odd frames and the even frames as well as among the lines. If the three low-order bits of each video data signal arc (0, 0, 1), the error is diffused in the direction of lines, and the prior art video data processing circuit produces an image on a display panel as shown in FIG. 3. In FIG. 3, the carry takes place at the pixels indicated by hatching lines. If the hatching lines fall from the left side toward the right side, the pixels belong to the odd frames. On the other hand, if the hatching lines fall from the right side toward the left side, the pixels belong to the even frames. The carry does not take place at the pixels without any hatching line.

The first problem inherent in the prior art video data processing circuit in unintentional stripe patter is produced on the display panel. The 8-bit video data signal with three low-order bits (0, 0, 1) is assumed to correspond a certain gray level of the 6-bit gradation. If the carry takes place in the adder 106, the adder 107 produces the 6-bit video data signal representative of a gray level higher than the certain gray level. As shown in FIG. 3, while the display panel is producing an ode frame, the carry takes place in the pixels indicated by the hatching lines falling from the left side toward the right side, and the bright pixels are obliquely arranged on the display panel like stripes. When the display panel changes the odd frame to the even frame, the carry takes place in the pixels indicated by the hatching lines falling from the right side toward the left side, and the bright pixels are also obliquely arranged like stripes. The prior art error diffusing circuit moves the bright pixels on the display panel between the odd frames and the even frames, and the stripe pattern is unintentionally produced on the display panel. The unintentional stripe pattern is due to the initial value only changed between the odd frames and the even frames.

Another problem inherent in the prior art error diffusing circuit is undesirable burning in a liquid crystal display panel. In case where the prior art error diffusing circuit supplies the 6-bit video data signals to a liquid crystal display panel, the polarity is alternated between the frames for driving the liquid crystal pixels. However, the initial values shown in FIG. 2 does not allow the prior art error diffusing circuit to alternate the polarity, because the initial value is differently changed between the odd frames and the even frames.

The Japanese Patent Publication of Unexamined Application teaches only the pattern of initial values shown in FIG. 2.

SUMMARY OF THE INVENTION

It is therefore an important object of the present invention to provide a method through which an initial value is varied for preventing a display panel from unintentional pattern and burning.

To accomplish the object, the present invention proposes to vary an initial value depending upon the combination of a frame number, a line number and a sort of input video data signals.

In accordance with one aspect of the present invention, there is provided a gray scale modifying circuit for producing a series of frames each having plural lines on a screen of an image producing apparatus comprising an input port supplied with input video data signals grouped into plural sorts, each of the input video data signals having a first predetermined number of bits representative of a piece of image to be produced in one of the frames of the series, an output port outputting output video data signals corresponding to the input video data signals, respectively, each of the output video data signals having a second predetermined number of bits representative of the piece of image, a signal converter connected between the input port and the output port, and producing the output video data signals from the input video data signals and a control data signal representative of a piece of control data information, and a control signal generator producing the control data signal used in a gray scale modification from the input video data signals belonging to a group of the sorts selected from the plural sorts to the corresponding output video data signals, and varying the piece of control data information depending upon the combination of a first number assigned to each of the frames, a second number assigned to each of the lines and the sort selected from the group of sorts and assigned to one of the input video data signals to be converted.

In accordance with another aspect of the present invention, there is provided a gray modification circuit for producing a series of frames each having plural lines on a display panel, the series of frames are divided into plural frame groups each having a first number of frames respectively assigned frame numbers, the plural lines are divided into plural line groups each having a second number of lines respectively assigned line numbers, and the gray modification circuit comprises an input port supplied with first input video data signals to last input data signals for each line, each of the first to last input video data signals having a first predetermined number of bits representative of one of the gray levels of a first gradation, the first input video data signals being grouped in color given to pieces of an image on the each line, an output port outputting first output video data signals to last output data signals for the each line, each of the first to last output data signals having a second predetermined number of bits representative of one of the gray levels of a second gradation different from the first gradation, an initial value generator producing a first control signal representative of an initial value variable depending upon the combination of the color, the frame number and the line number for each of the first input video data signals and a gray scale converter having input ports connected to the input port and the initial value generator and an output port connected to the output port and producing the first output video data signals from the first input video data signals and the first control signal and the last output video data signals from the last input video data signals and a second control signal internally produced therein.

BRIEF DESCRIPTION OF THE DRAWINGS

The features and advantages of the method will be more clearly understood from the following description taken in conjunction with the accompanying drawings in which:

FIG. 2 is a view showing the initial value changed in the prior art error diffusing circuit disclosed in Japanese Patent Publication of Unexamined Application No. 9-90902;

FIG. 5 is a view showing a table for defining a relation between the frame/line/color/input port and an initial value produced by an initial value generator incorporated in the error diffusion circuit;

FIG. 7 is a view showing patterns available for the variation of the initial value in a line group;

FIG. 9 is a view showing pixels on a frame produced through the gray scale modification;

FIG. 10 is a view showing another table for defining a relation between the frame/line/color/input port and an initial value produced by another initial value generator according to the present invention;

FIG. 11 is a view showing pixels on a first frame produced through a gray scale modification;

FIG. 12 is a view showing the pixels on a second frame;

FIG. 13 is a view showing the pixels on a third frame; and

FIG. 14 is a view showing the pixels on a fourth frame.

DESCRIPTION OF THE PREFERRED EMBODIMENTS

First Embodiment

Figure 1:
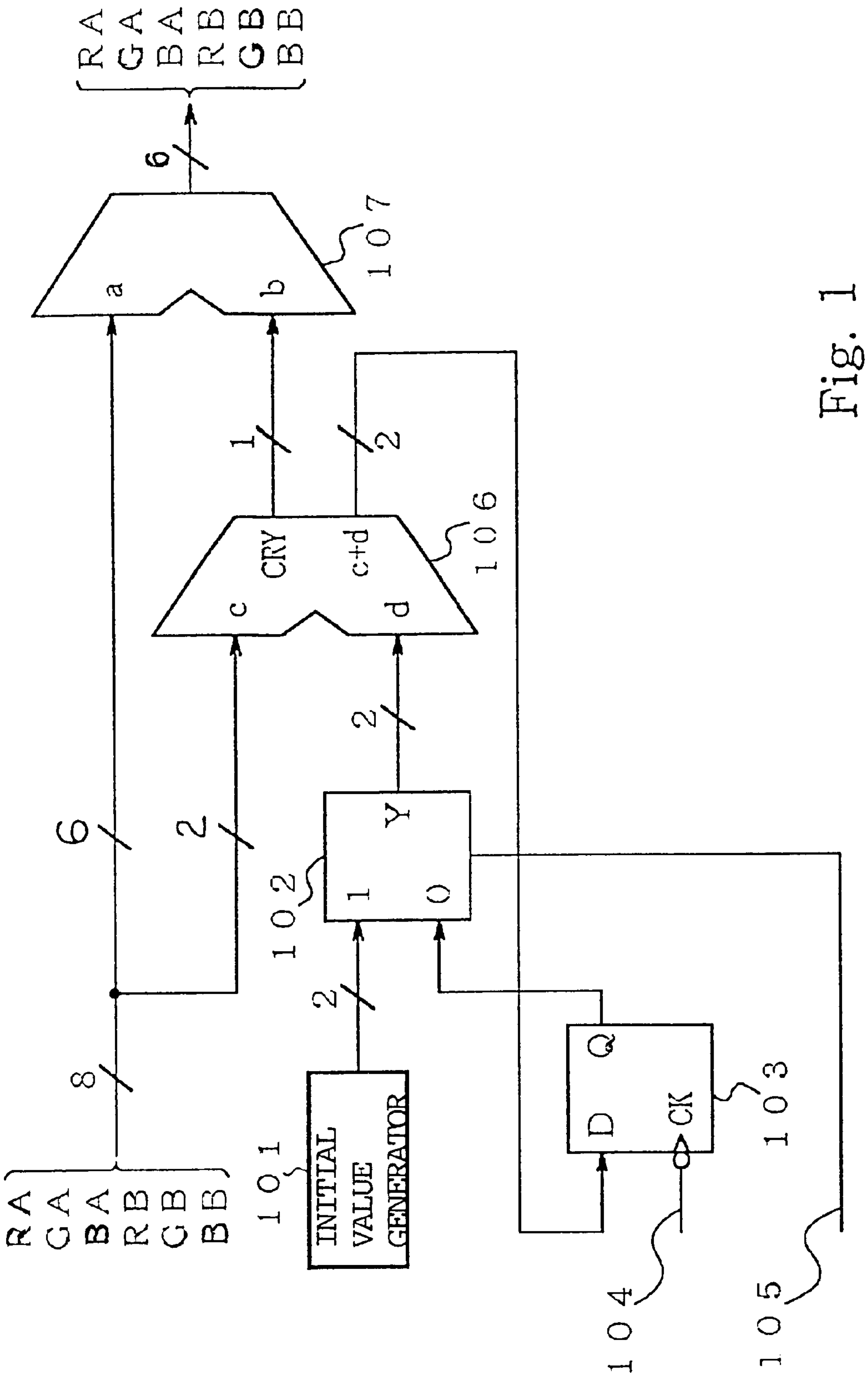
Fig. 1 PRIOR ART
FIG. 1 is a block diagram showing the circuit configuration of the prior art error diffusing circuit.
Figure 3:
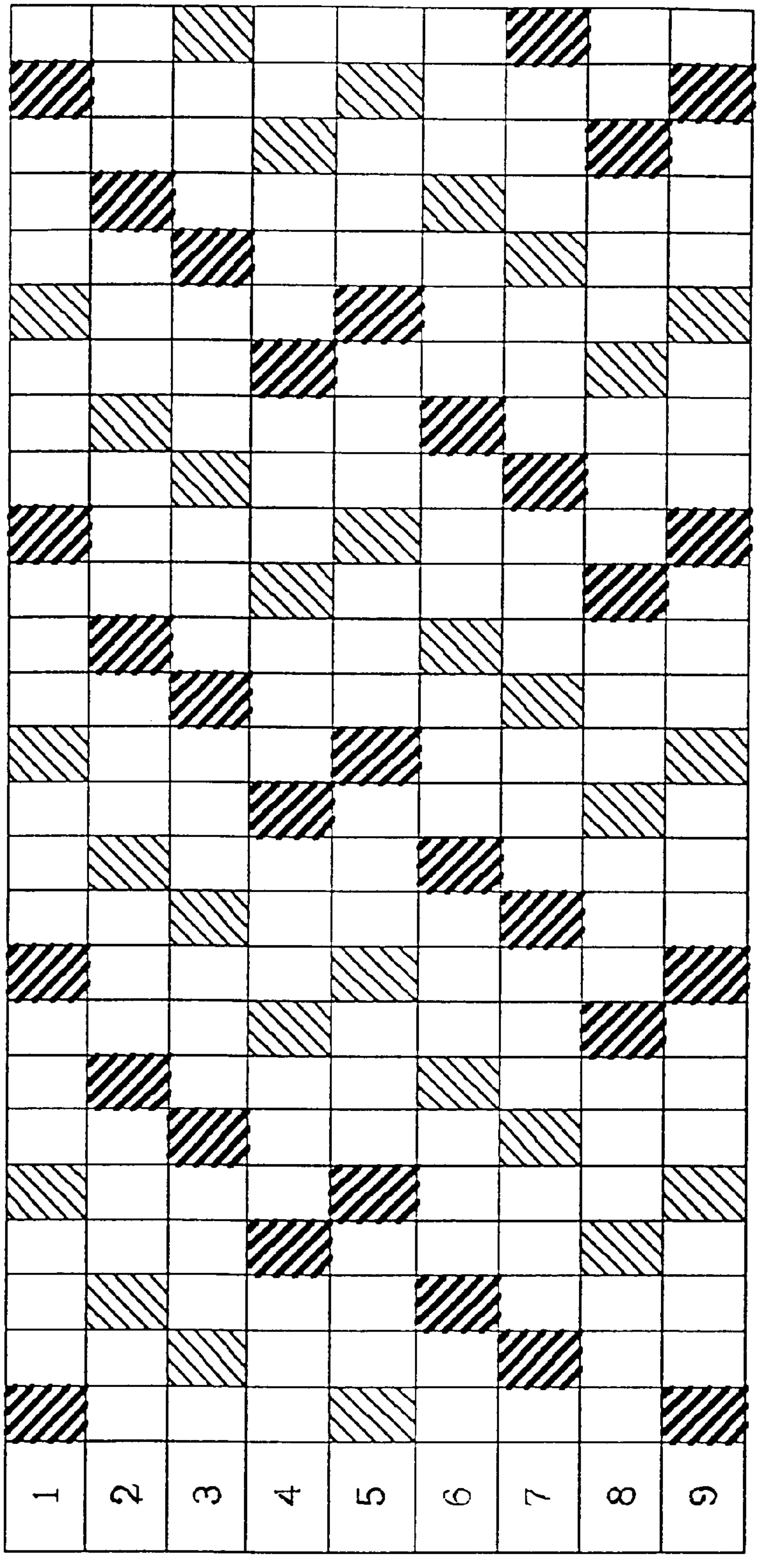
Fig. 3 PRIOR ART
FIG. 3 is a view showing the image produced on the display panel through the prior art error diffusing circuit.
Figure 4:
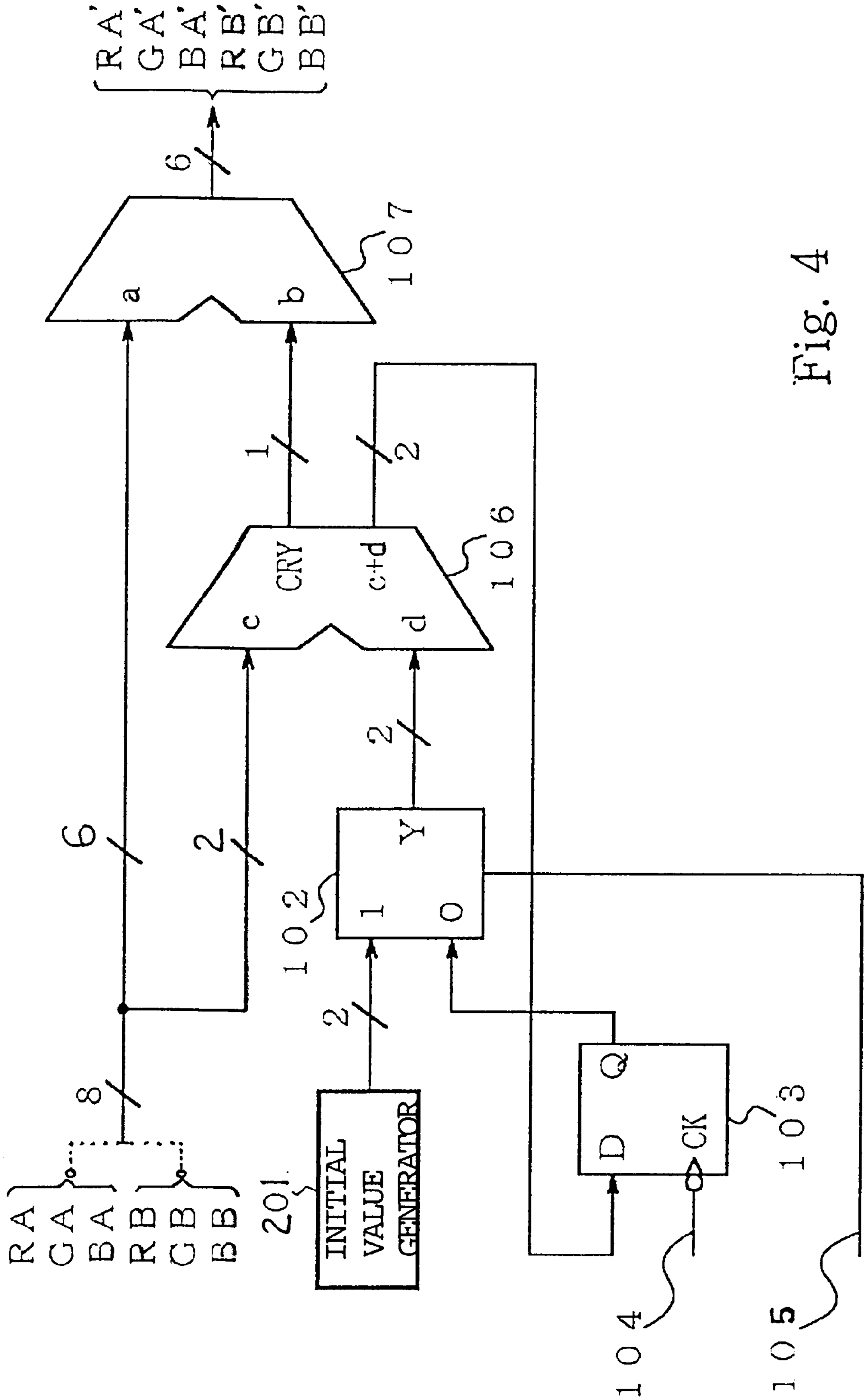
FIG. 4 is a block diagram showing the circuit configuration of an error diffusing circuit according to the present invention.

Referring to FIG. 4 of the drawings, an error diffusing circuit embodying the present invention. The error diffusing circuit is a kind of pseudo-gray scale modification circuit, and modifies n-bit gradation to m-bit gradation where n is greater than m. In this instance, n is eight, and m is six. Eight bit video data signals RA/GA/BA and RB/GB/BB are supplied to two ports of the error diffusing circuit. The eight-bit video data signal RA/GA/BA and RB/GB/BB is separated into six high-order bits and two low-order bits. The gray scale modification is carried out on the basis of the two low-order bits. The error diffusing circuit modifies the gray levels of the 8-bit gradation to gray levels of the 6-bit gradation, and produces 6-bit video data signals RA'/GA'/BA' and RB'/GB'/BB'. The 6-bit video data signals RA'/GA'/BA' and RB'/GB'/BB' are supplied to a display panel such as a liquid crystal display panel or a plasma display panel, and the display panel produces a picture thereon.

The error diffusing circuit is similar in circuit configuration to the prior art error diffusing circuit except an initial value generator 201. For this reason, other circuit components of the error diffusing circuit are labeled with the same references designating corresponding circuit components of the prior art error diffusing circuit without detailed description for the sake of simplicity.

The initial value generator 201 supplies an initial value to the selector 102, and changes the initial value as shown in FIG. 5. When the first video data signal RA/GA/BA/RB/GB/BB on each line arrives at either port, the initial value generator 201 changes the initial value. When the frame is changed from the current one to the next, the initial value generator also changes the relation between the video data signals RA/GA/BA/RB/GB/BB and the pattern of the initial values.

Figure 6:
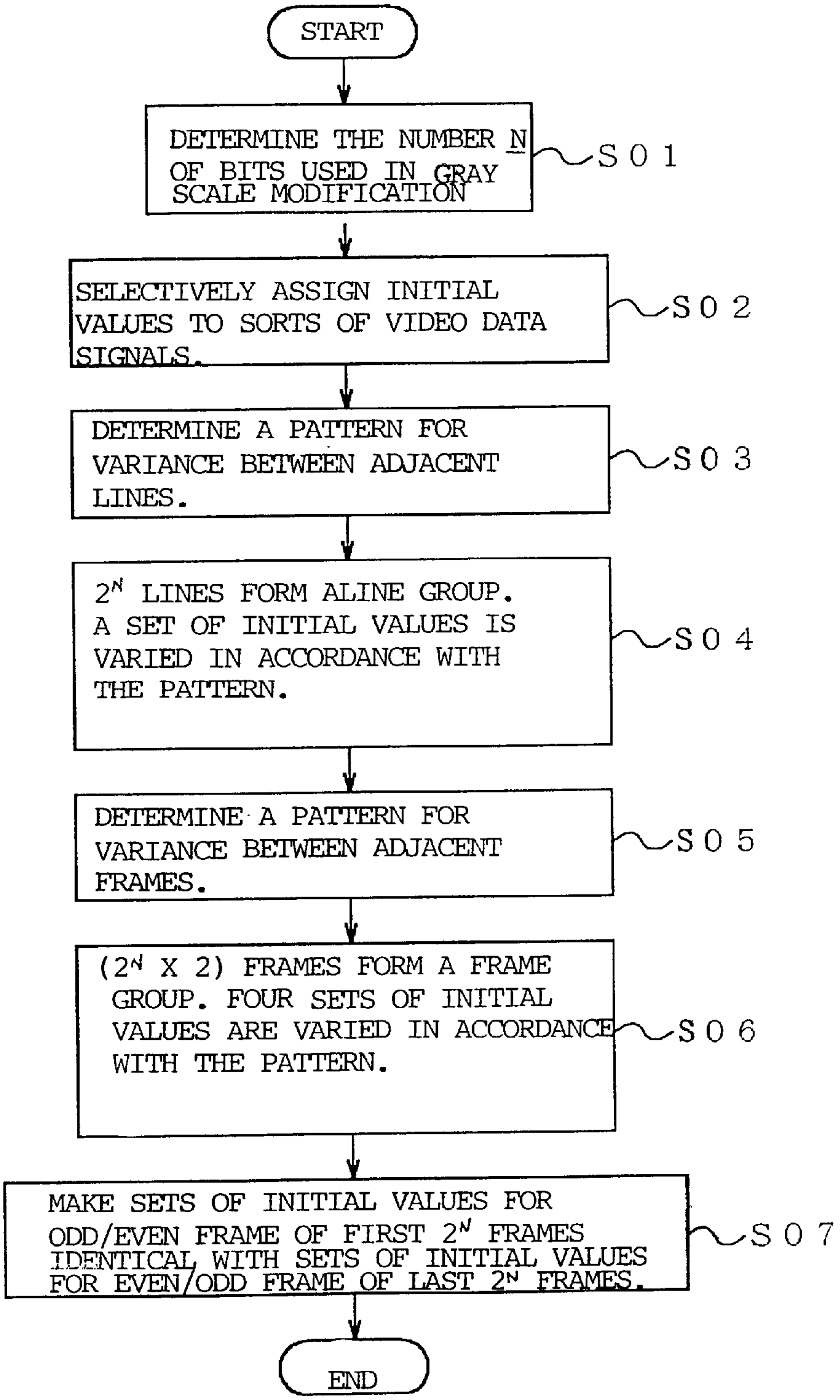
FIG. 6 is a view showing items taken into account for varying an initial value in a gray scale modification achieved by the error diffusing circuit.

When the relation shown in FIG. 5 is determined, items shown in FIG. 6 are taken into account. The relation may be tabulated so as to access the proper initial value with the address representative of the combination of a frame number, a line number and the sort of the video data signal RA/GA/BA/RB/GB/BB. Otherwise, the proper initial value may be calculated through a suitable computer program. The combination of the frame number, the line number and the sort of the video data signal RA/GA/BA/RB/GB/BB is hereinbelow referred to "condition". The relation between the initial values and the conditions is described as follows.

First, the number of bits N is taken into account as described in block S01. The number of bits N is used in the gray scale modification. The number N is equal to the signal lines from each of the ports to the adders 106. In this instance, the number N is two. For this reason, the signal lines propagate the two low-order bits to the input port "c" of the adder 106, and the other six high-order bits are supplied to the input port "a" of the adder 107 through other signal lines. If the number N is different from two, the initial values may be differently tabulated.

Second, initial values are selectively assigned to the sorts of video data signals RA, GA, BA, RB, GB and BB as described in block S02. In other words, a set of initial values is assigned to the first video data signals RA/GA/BA/RB/GB/BB. For example, if the first video data signals RA/GA/BA/RB/GB/BB are on the first line of the first frame, initial values equivalent to decimal numbers "0", "2", "1", "3", "0" and "2" are respectively assigned to the first video data signals RA/GA/BA/RB/GB/BB as shown in the first row of the table shown in FIG. 5.

Third, a patter is determined for the variance between adjacent lines as described in block S03. There are plural candidates as shown in FIG. 7. In this instance, pattern "1" is selected, and the initial value is incremented by one from one to the next.

Fourth, $2^N$ lines form a line group, and the sets of initial values for the line group are repeated on each line as described in block S04. In this instance, the number N is two, and four lines form the line group. The four lines of each line group are referred to the first line, the second line, the third line and the fourth line, respectively, and line numbers "1", "2", "3" and "4" are respectively assigned to the first line, the second line, the third line and the fourth line.

As described hereinbefore, the variance between adjacent two lines is one. Then, the four sets of initial values are assigned to the four lines of each line group. The four sets of initial values are hereinbelow referred to as "a group of initial value sets". The line group repeatedly takes place on each line, and, accordingly, the four sets of initial values are repeated on each line together with the line group. In other words, the fifth line, the ninth line and so forth have the set of initial value identical with that of the first line. In this instance, the set of initial values (0, 2, 1, 3, 0, 2) is assigned to the first line. One is added to each of the elements of the set. When one is added to the initial value "3", the initial value is represented by "0". For this reason, the next set assigned to the second line has the initial values (1, 3, 2, 0, 1, 3).

Figure 8:
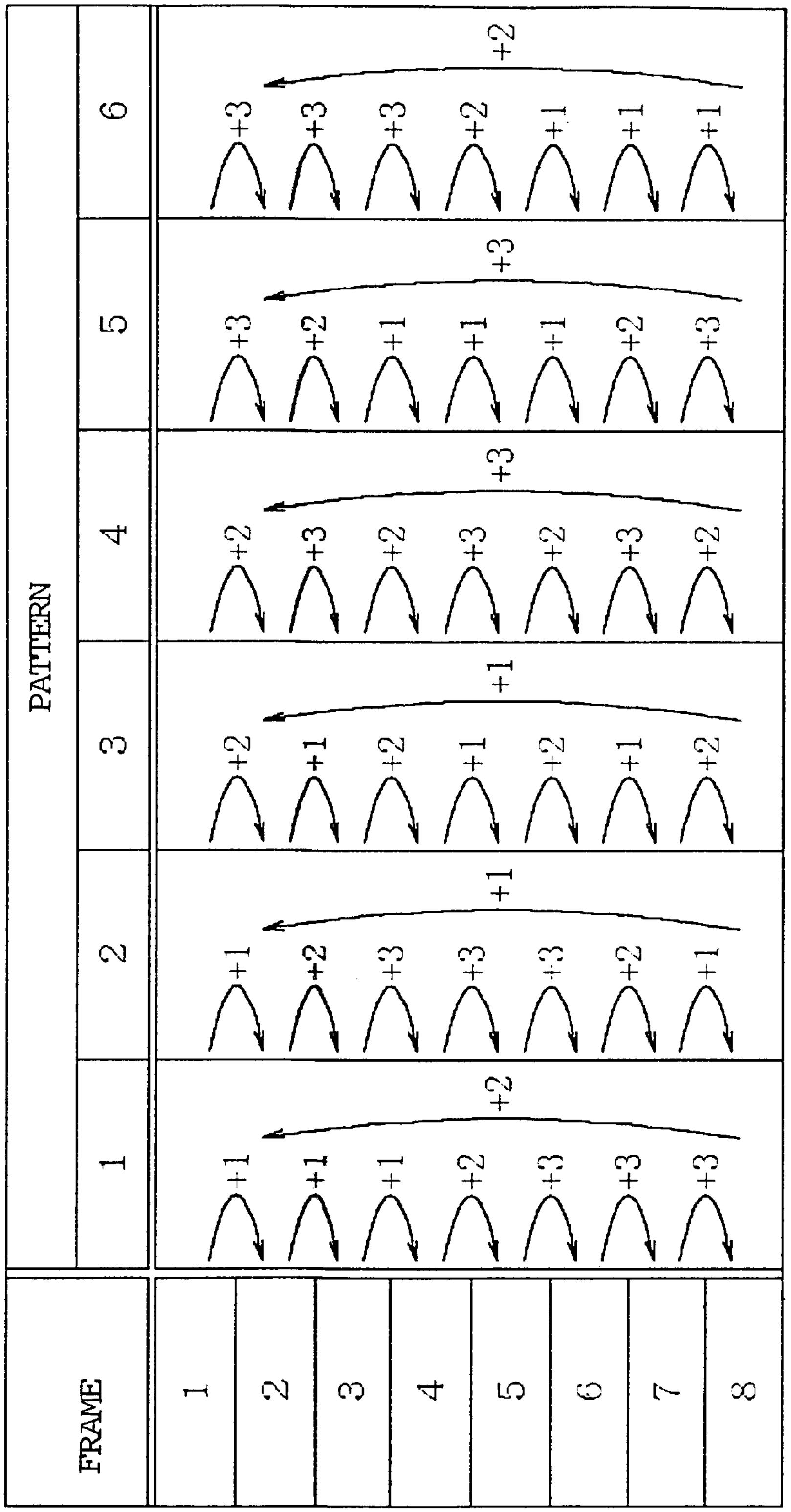
FIG. 8 is a view showing patterns available for the variation of the initial value in a frame group.

Fifth, a pattern is determined for the variance among the frames as described in block S05. There are plural candidates of the pattern as shown in FIG. 8. In this instance, pattern "4" is selected for the table shown in FIG. 5. ($2^N\times2$) frames form a frame group. In this instance, N is two, and eight frames form each frame pattern. The selected pattern is applied to the frame group. While the display panel is producing a picture, the frame group is repeated, and accordingly, the selected pattern is repeatedly used in the gray scale modification. The eight frames of each frame group are referred to as "first frame", "second frame", "third frame", "fourth frame", "fifth frame", "sixth frame", "seventh frame" and "eighth frame", respectively, and frame numbers "1", "2", "3", "4", "5", "6", "7" and "8" are respectively assigned to the first frame, the second frame, the third frame, the fourth frame, the fifth frame, the sixth frame, the seventh frame and the eighth frame. Pattern "4" indicates that the increment is changed from "2" through "3", "2", "3", "2" and "3" to "2". When the frame number returns from "8" to "1", the initial values are incremented by three.

Sixth, the four sets of initial values for the first frame are seven times varied in accordance with the pattern "4", and eight groups of initial value sets are determined as described in block S06. The four sets of initial values are changed from frame "1" through frames "2", "3", "4", "5", "6" and "7" to frame "8" in accordance with the fourth pattern of variances. The variance of each of the first to fourth lines is changed as "2", "3", "2", "3", "2", "3" and "2" for the first frame through the second frame, the third frame, the fourth frame, the fifth frame, the sixth frame and the seventh frame to the eighth frame. As a result, the eight groups of initial value sets are determined.

Finally, the pattern for the eight groups of initial value sets makes the four sets of initial values assigned to each odd frame of the first four frames, i.e., the first and third frames and the four sets of initial values assigned to each even frame of the first four frames, i.e., the second and fourth frames identical with the four sets of initial values assigned to each even frame of the last four frames, i.e., the sixth and eighth frames and the four sets of initial values assigned to each odd frame of the last four frames, i.e., the fifth and seventh frames as described in block S07. For example, the first line of the first frame and the first line of the second frame have the set of initial values (0, 2, 1, 3, 0, 2) and the set of initial values (2, 0, 3, 1, 2, 0), and the first line of the sixth frame and the first line of the fifth frame have the set of initial values (0, 2, 1, 3, 0, 2) and the set of initial values (2, 0, 3, 1, 2, 0). Thus, the sets of initial values assigned to the first lines of the first and second frames are respectively identical with the sets of initial values assigned to the first lines of the sixth and fifth frames. In this instance, the fifth, sixth, seventh and eighth frames have the groups of initial value sets identical with those of the second, first, fourth and third frames, respectively.

When the sets of initial values assigned to the first frame are varied in accordance with the pattern "4", the group of initial value sets assigned to each odd frame of the first $2^N$ frames is identical with the group of initial value sets assigned to the corresponding even frame of the last $2^N$ frames, and the group of initial value sets assigned to each even frame of the first $2^N$ frames is identical with the group of initial value sets assigned to the corresponding odd frame of the last $2^N$ frames.

The first condition written in block S01 to the sixth condition written in block S06 prevent the frames from unintentional pattern, and the seventh condition written in block S07 is effective against the burning in a liquid crystal display panel.

The error diffusing circuit according to the present invention behaves as follows. In the following description, the video data signal is labeled with "XYijk". "X" represents one of the primary three colors, i.e., red abbreviated as R, green abbreviated as G and B abbreviated as B. When a part of a picture is produced on a display panel on the basis of the video data signal XYijk, the part of the picture is colored in "X". "Y" is indicative of one of the ports to which the video data signal is supplied. As described hereinbefore, the error diffusing circuit has two ports, and the video data signals are selectively supplied to the two ports. The first port and the second port are indicated by "A" and "B". The suffixes "i", "j" and "k" are representative of the frame number, the line number and the position on the line. The frame number "i" is varied from "1" to "8", and the line number is changed from "1" to "4". The position is dependent on the display, and is changed from "1" to "xx".

Assuming now that the first video data signal RA111/GA111/BA111/RB111/GB111/BB111 is supplied to the error diffusion circuit for producing a part of picture on the first line of the first frame, and, thereafter, the second video data signal RA112/GA112/BA112/RB112/GB112/BB112 follow the first video data signal RA111/GA111/BA111/RB111/GB111/BB111 for producing the next part of picture on the first line of the first frame.

The initial value generator 201 produces a data signal representative of the initial value equivalent to the decimal number of "0", "2", "1", "3", "0" or "2" (see the set of initial values assigned to the first line of the first frame in FIG. 5). The control signal 105 has instructed the selector 102 to connect the input port "1" to the output port "Y". The data signal representative of the initial value is transferred through the selector 102 to the input port "d" of the adder 106, and the adder 106 adds the initial value to the value represented by the two low-order bits of the first video data signal RA111/GA111/BA111/RB111/GB111/BB111. The addition results in the sum (c+d) and the carry CRY. The carry is either "1" or "0". The adder 106 produces a sum signal representative of the sum (c+d) and a carry signal representative of the carry CRY. The sum signal is supplied to the input node D of the flip flop circuit 103, and is latched by the flip flop circuit 103 at the next pulse rise of a clock signal 104. On the other hand, the carry signal is supplied to the input node "b" of the adder 107, and the carry is added to the value represented by the six high-order bits of the first video data signal RA111/GA111/BA111/RB111/GB111/BB111. The addition results in a six-bit video data signal RA'111/GA'111/BA'111/RB'111/GB'111/BB'111, and the six-bit video data signal RA'111/GA'111/BA'111/RB'111/GB'111/BB'111 is supplied to the panel display for producing the part of the picture on the first line of the first frame. Thus, the error diffusion circuit achieves a gray scale modification from the 8-bit gradation to the 6-bit gradation on the basis of the initial value "0", "2", "1", "3", "0", or "2".

When the second video data signal RA112/GA112/BA112/RB112/GB112/BB112 arrives at the input port, the control signal instructs the selector 102 to connect the input port "0" to the output port "Y", and the sum (c+d) is supplied to the input port "d" of the adder 106. The adder 106 adds the sum (c+d) to the value represented by the two low-order bits of the second video data signal RA112/GA112/BA112/RB112/GB112/BB112, and, thereafter, the adder 107 adds the carry to the value represented by the six high-order bits of the second video data signal RA112/GA112/BA112/RB112/GB112/BB112. The addition results in the six-bit video data signal RA'112/GA'112/BA'112/RB'112/GB'112/BB'112, and the six-bit video data signal RA'112/GA'112/BA'112/RB'112/GB'112/BB'112 is supplied to the panel display for producing the next part of the picture on the same line of the same frame. The error diffusing circuit repeats the function for producing the remaining parts of the picture on the first line of the first frame.

When the display panel changes the first line of the first frame to the second line of the same frame, the first video data signal RA121/GA121/BA121/RB121/GB121/BB121 is supplied to the error diffusion circuit for producing another part of the picture on the second line of the first frame, and the second video data signal RA122/GA122/BA122/RB122/GB122/BB122 follows the first video data signal RA121/GA121/BA121/RB121/GB121/BB121 for producing the next part of the picture on the second line of the first frame.

The initial value generator 201 produces the data signal representative of the initial value equivalent to the decimal number of "1", "3", "2", "0", "1" or "3" (see the set of initial values assigned to the second line of the first frame in FIG. 5). The control signal 105 has instructed the selector 102 to connect the input port "1" to the output port "Y". The data signal representative of the initial value is transferred through the selector 102 to the input port "d" of the adder 106, and the adder 106 adds the initial value to the value represented by the two low-order bits of the first video data signal RA121/GA121/BA121/RB121/GB121/BB121. The addition results in the sum (c+d) and the carry CRY. The adder 106 produces the sum signal representative of the sum (c+d) and the carry signal representative of the carry CRY. The sum signal is supplied to the input node D of the flip flop circuit 103, and is latched by the flip flop circuit 103 at the next pulse rise of the clock signal 104. On the other hand, the carry signal is supplied to the input node "b" of the adder 107, and the carry is added to the value represented by the six high-order bits of the first video data signal RA121/GA121/BA121/RB121/GB121/BB121. The addition results in a six-bit video data signal RA'121/GA'121/BA'121/RB'121/GB'121/BB'121, and the six-bit video data signal RA'121/GA'121/BA'121/RB'121/GB'121/BB'121 is supplied to the panel display for producing the part of the picture on the second line of the first frame.

When the second video data signal RA122/GA122/BA122/RB122/GB122/BB122 arrives at the input port, the control signal instructs the selector 102 to connect the input port "0" to the output port "Y", and the sum (c+d) is supplied to the input port "d" of the adder 106. The adder 106 adds the sum (c+d) to the value represented by the two low-order bits of the second video data signal RA122/GA122/BA122/RB122/GB122/BB122, and, thereafter, the adder 107 adds the carry to the value represented by the six high-order bits of the second video data signal RA122/GA122/BA122/RB122/GB122/BB122. The addition results in the six-bit video data signal RA'122/GA'122/BA'122/RB'122/GB'122/BB'122, and the six-bit video data signal RA'122/GA'122/BA'122/RB'122/GB'122/BB'122 is supplied to the panel display for producing the next part of the picture on the same line of the same frame. The error diffusing circuit repeats the function for producing the remaining parts of the picture on the second line of the first frame.

In the similar manner, the error diffusion circuit repeats the above-described function for producing parts of the picture on the third and fourth lines of the first frame. The initial value generator 201 changes the initial values to (2, 0, 3, 1, 2, 0) for the first video data signal in the image production on the third line of the first frame and to (3, 1, 0, 2, 3, 1) for the first video data signals in the image production on the fourth line of the first frame. The error diffusing circuit repeats the function for producing the picture on the other line groups of the first frame, and the picture is completed on the panel display.

When the panel display changes the first frame to the second frame, the first video data signal RA211/GA211/BA211/RB211/GB211/BB211 is supplied to the error diffusion circuit for producing a part of another picture on the first line of the second first frame, and, thereafter, the second video data signal RA212/GA212/BA212/RB212/GB212/BB212 follows the first video data signal RA211/GA211/BA211/RB211/GB211/BB211 for producing the next part of the picture on the first line of the second frame.

The initial value generator 201 produces the data signal representative of the initial value equivalent to the decimal number of "2", "0", "3", "1", "2" or "0" (see the set of initial values assigned to the first line of the second frame in FIG. 5). The control signal 105 has instructed the selector 102 to connect the input port "1" to the output port "Y". The data signal representative of the initial value is transferred through the selector 102 to the input port "d" of the adder 106, and the adder 106 adds the initial value to the value represented by the two low-order bits of the first video data signal RA211/GA211/BA211/RB211/GB211/BB211. The addition results in the sum (c+d) and the carry CRY. The carry is either "1" or "0". The adder 106 produces the sum signal representative of the sum (c+d) and the carry signal representative of the carry CRY. The sum signal is supplied to the input node D of the flip flop circuit 103, and is latched by the flip flop circuit 103 at the next pulse rise of a clock signal 104. On the other hand, the carry signal is supplied to the input node "b" of the adder 107, and the carry is added to the value represented by the six high-order bits of the first video data signal RA211/GA211/BA211/RB211/GB211/BB211. The addition results in the six-bit video data signal RA'211/GA'211/BA'211/RB'211/GB'211/BB'211, and the six-bit video data signal RA'211/GA'211/BA'211/RB'211/GB'211/BB'211 is supplied to the panel display for producing the part of the picture on the first line of the second frame.

When the second video data signal RA212/GA212/BA212/RB212/GB212/BB212 arrives at the input port, the control signal instructs the selector 102 to connect the input port "0" to the output port "Y", and the sum (c+d) is supplied to the input port "d" of the adder 106. The adder 106 adds the sum (c+d) to the value represented by the two low-order bits of the second video data signal RA212/GA212/BA212/RB212/GB212/BB212, and, thereafter, the adder 107 adds the carry to the value represented by the six high-order bits of the second video data signal RA212/GA212/BA212/RB212/GB212/BB212. The addition results in the six-bit video data signal RA'212/GA'212/BA'212/RB'212/GB'212/BB'212, and the six-bit video data signal RA'212/GA'212/BA'212/RB'212/GB'212/BB'212 is supplied to the panel display for producing the next part of the picture on the same line of the same frame. The error diffusing circuit repeats the above-described function for producing the remaining parts of the picture on the first line of the second frame.

When the display panel changes the first line of the second frame to the second line of the same frame, the first video data signal RA221/GA221/BA221/RB221/GB221/BB221 is supplied to the error diffusion circuit for producing another part of the picture on the second line of the second frame, and the second video data signal RA222/GA222/BA222/RB222/GB222/BB222 follows the first video data signal RA221/GA221/BA221/RB221/GB221/BB221 for producing the next part of the picture on the second line of the second frame.

The initial value generator 201 produces the data signal representative of the initial value equivalent to the decimal number of "3", "1", "0" "2", "3" or "1" (see the set of initial values assigned to the second line of the second frame in FIG. 5). The control signal 105 has instructed the selector 102 to connect the input port "1" to the output port "Y". The data signal representative of the initial value is transferred through the selector 102 to the input port "d" of the adder 106, and the adder 106 adds the initial value to the value represented by the two low-order bits of the first video data signal RA221/GA221/BA221/RB221/GB221/BB221. The addition results in the sum (c+d) and the carry CRY. The adder 106 produces the sum signal representative of the sum (c+d) and the carry signal representative of the carry CRY. The sum signal is supplied to the input node D of the flip flop circuit 103, and is latched by the flip flop circuit 103 at the next pulse rise of the clock signal 104. On the other hand, the carry signal is supplied to the input node "b" of the adder 107, and the carry is added to the value represented by the six high-order bits of the first video data signal RA221/GA221/BA221/RB221/GB221/BB221. The addition results in a six-bit video data signal RA'221/GA'221/BA'221/RB'221/GB'221/BB'221, and the six-bit video data signal RA'221/GA'221/BA'221/RB'221/GB'221/BB'221 is supplied to the panel display for producing the part of the picture on the second line of the second frame.

When the second video data signal RA222/GA222/BA222/RB222/GB222/BB222 arrives at the input port, the control signal instructs the selector 102 to connect the input port "0" to the output port "Y", and the sum (c+d) is supplied to the input port "d" of the adder 106. The adder 106 adds the sum (c+d) to the value represented by the two low-order bits of the second video data signal RA222/GA222/BA222/RB222/GB222/BB222, and, thereafter, the adder 107 adds the carry to the value represented by the six high-order bits of the second video data signal RA222/GA222/BA222/RB222/GB222/BB222. The addition results in the six-bit video data signal RA'222/GA'222/BA'222/RB'222/GB'222/BB'222, and the six-bit video data signal RA'222/GA'222/BA'222/RB'222/GB'222/BB'222 is supplied to the panel display for producing the next part of the picture on the same line of the same frame. The error diffusing circuit repeats the function for producing the remaining parts of the picture on the second line of the second frame.

In the similar manner, the error diffusion circuit repeats the above-described function for producing other parts of the picture on the third and fourth lines of the first frame. The initial value generator 201 changes the initial values to (0, 2, 1, 3, 0, 2) for the first video data signal in the image production on the third line of the second frame and to (1, 3, 2, 0, 1, 3) for the first video data signals in the image production on the fourth line of the second frame. The error diffusing circuit repeats the functions for producing the picture on the other line groups of the second frame so as to complete the picture on the display panel.

In the similar manner, the error diffusing circuit repeats the above-described functions for producing the third frame to the eight frames, and the initial value generator 201 sequentially changes the set of initial values as shown in FIG. 5. When the error diffusing circuit completes the picture of the eighth frame on the panel display, the initial value generator 201 produces the group of initial value sets assigned to the first frame.

FIG. 9 shows the picture of the first frame on the display panel. The picture is produced on the basis of the video data signals, the two low-order bits of which are (x, x, x, x, x, x, 0, 1). The least significant bit is "1". The carry takes place at the pixels labeled with "0", and "1", "2" and "3" are the error values at the pixels. When the sum reaches "4", the carry takes place, and the error value returns to "0". The second frame, the third frame and the fourth frame have the first lines respectively identical with the third line, the second line and the fourth line of the first frame. The fifth frame to the eight frames are identical with the second, first, fourth and third frames, respectively. The pixel labeled with "0" is dispersed over the panel display, and any unintentional pattern is never recognized.

As will be understood from the foregoing description, the initial value is valued depending upon the combination of a frame number, a line number and the sort of the video data signal RA/GA/BA/RB/GB/BB, and the conditions S01 to S07 are taken into account for determining the relation between the initial value and the combination. As a result, any unintentional pattern is not produced on the display panel.

Second Embodiment

Another error diffusing circuit embodying the present invention is similar to the error diffusing circuit implementing the first embodiment except an initial value generator. For this reason, the circuit components are hereinbelow labeled with the same references designating corresponding circuit components of the first embodiment. However, the initial value generator of the second embodiment is hereinbelow labeled with 201' in order to discriminate it from the initial value generator 201 of the first embodiment.

Video data signals RA/GA/BA and RB/GB/BB are supplied to the error diffusing circuit through two ports, and the initial value generator 201' incorporated in the second embodiment also supplies an initial value through the selector 102 to the adder 106. Two low-order bits are supplied to the adder 106, and the six high-order bits are directly supplied to the adder 107. The initial value generator 201' varies the initial value depending upon the combination of the frame number, the line number and the sort of the video data signal RA/GA/BA/RB/GB/BB, and the relation between the initial value and the combination is shown in FIG. 10.

Four lines form a line group, and each frame includes plural line groups. Four sets of initial values arc respectively assigned to the four lines of each line groups as similar to the first embodiment. In this instance, pattern "2" (see FIG. 7) is employed for the sets of initial values. The difference between the initial values of the first set and the initial values of the second set is one, and the initial values are incremented by two from the second set to the third set. The increment between the third set and the fourth set is three. When the line group is changed from one to the next, the initial value generator returns to the first set. The four sets of initial values assigned to each frame are referred to as "group of initial value set".

Eight frames form a frame group, and eight (groups of initial value sets are respectively assigned to the eighth frames of each frame group. The frame group is divided into two frame sub-groups, i.e., the first frame to the fourth frame and the fifth frame to the eighth frame. The first frame, the second frame, the third frame and the fourth frame have the groups of initial value sets identical with those of the sixth frame, the fifth frame, the eighth frame and the seventh frame, respectively. Any one of the six patterns (see FIG. 8) results in the above-described relation among the eight frames. In this instance, pattern "6" (see FIG. 8) is employed in this instance. The set of initial value (0, 1, 3, 2, 0, 1) is assigned to the first line of the first frame. The initial values of the set are varied in accordance with the pattern "2" shown in FIG. 7 and the pattern "6" shown in FIG. 8 so as to obtain the table shown in FIG. 10.

The error diffusing circuit implementing the second embodiment behaves as similar to the first embodiment. The video data signals are assumed to have a bit string ( x, x, x, x, x, x, 0, 1). The error diffusing circuit produces the six-bit video data signals through the gray scale modification, and supplies the six-bit video data signals to the panel display. The frames are successively produced on the panel display, and the first frame to the fourth frame are shown in FIGS.

11 to 14. The fifth frame, the sixth, the seventh and the eighth frame are similar to the second frame, the first frame, the fourth frame and the third frame, respectively. Although the carry takes place at the pixels labeled with "0", the pixels do not form any pattern.

As will be appreciated from the foregoing description, the initial value is varied in dependence on the combination of the frame number, the line number and the sort of the video data signals, and any unintentional pattern is produced on the display.

The frame group is divided into the first sub-group, i.e., the first frame to the fourth frame and the second sub-group, i.e., the fifth frame to the eighth frame, and the groups of initial value sets assigned to the odd frames of the first sub-group and the groups of initial value sets assigned to the even frame of the first sub-group are used as the groups of initial value sets assigned to the even frames of the second sub-group and the groups of initial value sets assigned to the odd frames of the second sub-group. Even if the gray scale modification circuit according to the present invention is connected to a liquid crystal display panel, the liquid crystal is alternately biased, and any burning does not take place in the liquid crystal display panel.

In the above-described embodiments, the flip flop circuit 103, the selector 102 and the adders 106/107 as a whole constitute a signal converter or a gray scale converter, and the initial value generator 201/201' serves as a control signal generator.

Although particular embodiments of the present invention have been shown and described, it will be apparent to those skilled in the art that various changes and modifications may be made without departing from the spirit and scope of the present invention.

For example, any one of the patterns shown in FIG. 7 is available for the variation among the four sets of initial values. Similarly, any one of the patterns shown in FIG. 8 results in a set of initial values varied depending upon the combination of the frame number, the line number and the sort of the video data signals.

The initial value generator according to the present invention is available for another kind of gray scale modifying circuit in so far as an initial value is used in the gray scale modification.

What is claimed is:

1. A gray scale modifying circuit for producing a series of frames each having plural lines on a screen of an image producing apparatus, comprising:

an input port supplied with input video data signals grouped into plural sorts, each of said input video data signals having a first predetermined number of bits representative of a piece of image to be produced in one of the frames of said series;

an output port outputting output video data signals corresponding to said input video data signals, respectively, each of said output video data signals having a second predetermined number of bits representative of the piece of image;

a signal converter connected between said input port and said output port, and producing said output video data signals from said input video data signals and a control data signal representative of a piece of control data information; and a control signal generator producing said control data signal used in a gray scale modification from the input video data signals belonging to a group of the sorts selected from said plural sorts to the corresponding output video data signals, and varying said piece of control data information depending upon a pattern indicated by the combination of a first number assigned to each of said frames, a second number assigned to each of said lines and the sort selected from said group of sorts and assigned to one of said input video data signals to be converted.

2. A gray scale modifying circuit for producing a series of frames each having plural lines on a screen of an image producing apparatus, comprising:

an input port supplied with input video data signals grouped into plural sorts, each of said input video data signals having a first predetermined number of bits representative of a piece of image to be produced in one of the frames of said series;

an output port outputting output video data signals corresponding to said input video data signals, respectively, each of said output video data signals having a second predetermined number of bits representative of the piece of image;

a signal converter connected between said input port and said output port, and producing said output video data signals from said input video data signals and a control data signal representative of a piece of control data information; and a control signal generator producing said control data signal used in a gray scale modification from the input video data signals belonging to a group of the sorts selected from said plural sorts to the corresponding output video data signals, and varying said piece of control data information depending upon the combination of a first number assigned to each of said frames, a second number assigned to each of said lines and the sort selected from said group of sorts and assigned to one of said input video data signals to be converted;

wherein a relation between the initial values to be produced and the combinations of said first numbers, said second numbers and said sorts satisfies the following conditions:

said first number is varied from 1 to $2\times2^N$ where N is the number of bits forming part of said first predetermined number of bits and used in said gray scale modification;

said second number is varied from 1 to $2^N$ where N is said number of bits, the piece of control data information is variable together with the sort of said group;

the piece of control data information is variable together with said first number; and the piece of control data information is variable together with said second number.

3. The gray scale modification circuit as set forth in claim 2, in which said piece of control data information assigned to each odd frame of first $2^N$ frames and said piece of control data information assigned to each even frame of said $2^N$ frames are identical with said piece of control data information assigned to each even frame of the next $2^N$ frames and said piece of control data information assigned to each odd frame of said next $2^N$ frames, respectively.

4. The gray scale modifying circuit as set forth in claim 1, in which said piece of control data information is representative of an error value to be added to the value represented by the number of bits forming part of said first predetermined number of bits and used in said gray scale modification.

5. The gray scale modifying circuit as set forth in claim 4, in which said signal converter includes a first adder adding said error value to said value represented by the number of bits forming part of said first predetermined number of bits to see whether or not a carry takes place, and a second adder adding said carry to a value represented by remaining bits of said first predetermined number of bits for producing each of said output video data signals, said remaining bits forming said each of said output video data signals when said first adder completes the addition without any carry bit.

6. The gray scale modifying circuit as set forth in claim 2, in which said group of sorts represents that said input video data signals are first ones of said sorts on each line.

7. The gray scale modifying circuit as set forth in claim 6, in which said sorts of said group are representative of primary three colors to be given to pieces of said image.

8. A gray modification circuit for producing a series of frames each having plural lines on a display panel, said series of frames being divided into plural frame groups each having a first number of frames respectively assigned frame numbers, said plural lines being divided into plural line groups each having a second number of lines respectively assigned line numbers, said gray modification circuit comprising an input port supplied with first input video data signals to last input data signals for each line, each of said first to last input video data signals having a first predetermined number of bits representative of one of the gray levels of a first gradation, said first input video data signals being grouped in color given to pieces of an image on said each line, an output port outputting first output video data signals to last output data signals for said each line, each of said first to last output data signals having a second predetermined number of bits representative of one of the gray levels of a second gradation different from said first gradation, an initial value generator producing a first control signal representative of an initial value variable depending upon a pattern indicated by the combination of said color, the frame number and the line number for each of said first input video data signals, and a gray scale converter having input ports connected to said input port and said initial value generator and an output port connected to said output port and producing said first output video data signals from said first input video data signals and said first control signal and said last output video data signals from said last input video data signals and a second control signal internally produced therein.

9. A gray scale modification circuit, or producing a series of frames each having plural lines on a display panel, said series of frames being divided into plural frame groups each having a first number of frames respectively assigned frame numbers, said plural lines being divided into plural line groups each having a second number of lines respectively assigned line numbers, said gray modification circuit comprising:

an input port supplied with first input video data signals to last input data signals for each line, each of said first to last input video data signals having a first predetermined number of bits representative of one of the gray levels of a first gradation, said first input video data signals being grouped in color given to pieces of an image on said each line, an output port outputting first output video data signals to last output data signals for said each line, each of said first to last output data signals having a second predetermined number of bits representative of one of the gray levels of a second gradation different from said first gradation, an initial value generator producing a first control signal representative of an initial value variable depending upon the combination of said color, the frame number and the line number for each of said first input video data signals, and a gray scale converter having input ports connected to said input port and said initial value generator and an output port connected to said output port and producing said first output video data signals from said first input video data signals and said first control signal and said last output video data signals from said last input video data signals and a second control signal internally produced therein, wherein said initial value is varied under the following conditions:

said first number is equal to $2\times2^N$ where N is the number of bits forming part of each first input video data signal and used in said gray scale modification;

said second number is equal to $2^N$;

the initial values respectively assigned to said first input video data signals are varied together with said line number in each line group so that sets of initial values are repeatedly used in each frame, and the initial values of said sets are varied together with said frame number in said series of frames.

10. The gray scale modification circuit as set forth in claim 9, in which said sets of initial values assigned to odd frames of half of said frame group and said sets of initial values assigned to even frames of said half of said frame group are respectively identical with the sets of initial values assigned to even frames of the other half of said frame group and the sets of initial values assigned to odd frames of said other half of said frame group.

* * * * *